United States Patent
Chen et al.

(10) Patent No.: US 8,622,675 B2
(45) Date of Patent: Jan. 7, 2014

(54) SCREW STRUCTURE

(75) Inventors: Yun-Lung Chen, New Taipei (TW); Xian Shu, Wuhan (CN)

(73) Assignees: Hong Fu Jin Precision Industry (WuHan) Co., Ltd., Wuhan (CN); Hon Hai Precision Industry Co., Ltd., New Taipei (TW)

(*) Notice: Subject to any disclaimer, the term of this patent is extended or adjusted under 35 U.S.C. 154(b) by 59 days.

(21) Appl. No.: 13/425,389

(22) Filed: Mar. 20, 2012

(65) Prior Publication Data

US 2013/0017036 A1    Jan. 17, 2013

(30) Foreign Application Priority Data

Jul. 14, 2011   (CN) .......................... 2011 1 0196980

(51) Int. Cl.
*F16B 43/00* (2006.01)
(52) U.S. Cl.
USPC .................. 411/397; 411/371.2; 411/999

(58) Field of Classification Search
USPC ............. 411/371.2, 378, 397, 402, 404, 974, 411/999
See application file for complete search history.

(56) References Cited

U.S. PATENT DOCUMENTS

| | | | | |
|---|---|---|---|---|
| 2,036,875 A | * | 4/1936 | Kraft | 215/360 |
| 4,641,986 A | * | 2/1987 | Tsui et al. | 403/164 |
| 5,248,176 A | * | 9/1993 | Fredriksson | 294/215 |
| 5,405,210 A | * | 4/1995 | Tsui | 403/119 |
| 5,634,734 A | * | 6/1997 | Schron et al. | 403/78 |
| 5,743,576 A | * | 4/1998 | Schron et al. | 294/215 |
| 7,114,872 B2 | * | 10/2006 | Alba | 403/78 |

* cited by examiner

*Primary Examiner* — Roberta Delisle
(74) *Attorney, Agent, or Firm* — Altis Law Group, Inc.

(57) ABSTRACT

A screw structure for securing a first object to a second object comprises a screw member, a blocking member and a pivot member. The screw member comprises a pole. The blocking member comprises a base portion secured to the pole, and two positioning portions are located on the base portion. The pivot member comprises two latching portions, and each of the two latching portions is engaged between the screw member and each of the two positioning portions. The pivot member is capable of rotation relative to the screw member and the blocking member.

16 Claims, 4 Drawing Sheets

SCREW STRUCTURE

BACKGROUND

1. Technical Field

The present disclosure relates to screw structures, and particularly to a screw structure to secure a first object to a second object.

2. Description of Related Art

A separate tool, such as a screwdriver, is usually needed to assemble or disassemble a first object and a second objected when the first object and the second object are secured by means of screws. However, such a separate tool may not be readily available.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
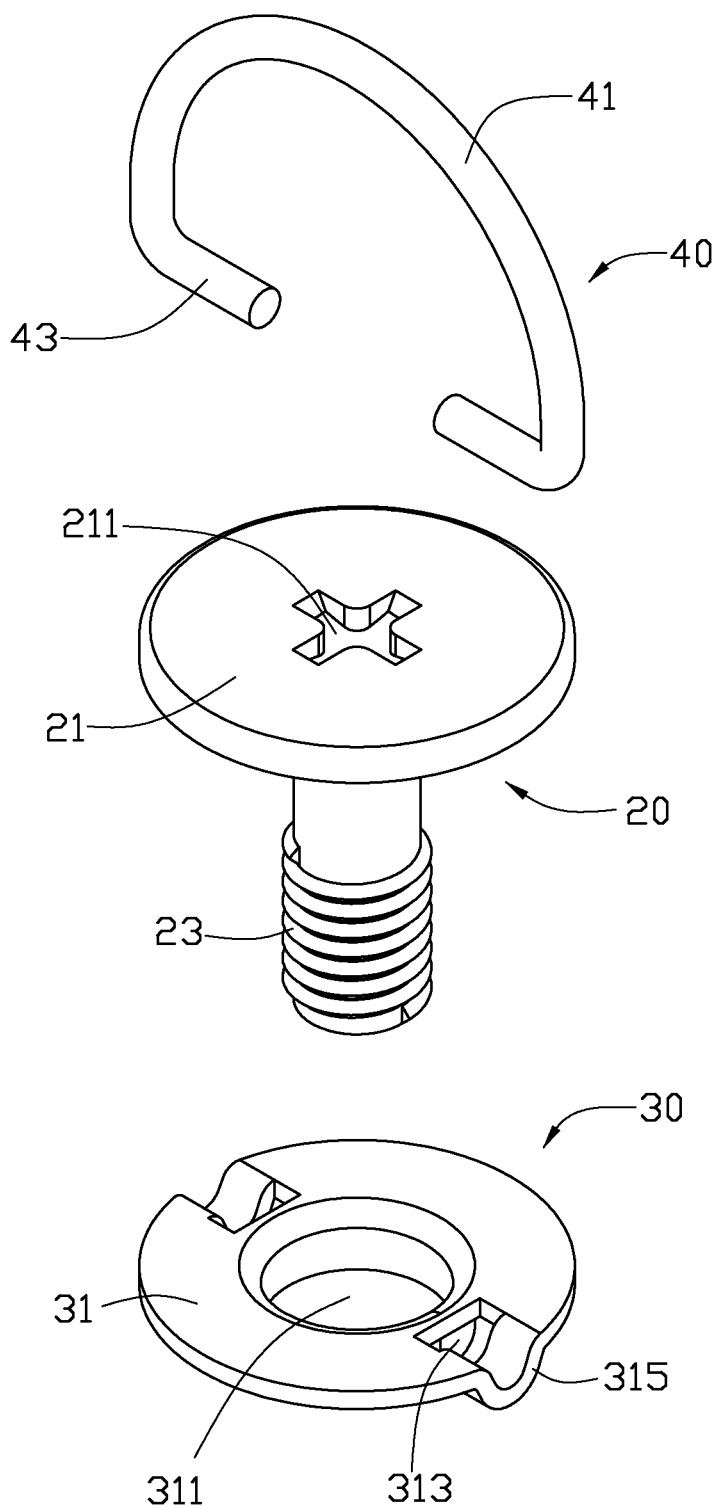
FIG. 1 is an exploded, isometric view of an embodiment of a screw structure.

Referring to FIG. 1, a screw structure in accordance with an embodiment comprises a screw member 20, a blocking member 30 and a pivot member 40. The screw structure is configured for securing a first object 50 (shown in FIG. 4) to a second object 60 (shown in FIG. 4).

The screw member 20 comprises a cap 21 and a pole 23 extending from the cap 21. An operating recess 211 is defined in the cap 21. In one embodiment, the cap 21 is substantially circular. The pole 23 comprises a stopper portion 231, a connecting portion 233 and a screw portion 235. The stopper portion 231 extends from the cap 21, and a plurality of threads 2311 is located on a sidewall of the stopper portion 231. In one embodiment, a size of a cross-sectional area of the stopper portion 231 is smaller than that of a cross-sectional area of the cap 21. The connecting portion 233 extends from the stopper portion 231. In one embodiment, a size of cross-sectional area of the connecting portion 233 is smaller than that of a cross-sectional area of the stopper portion 231. The screw portion 235 extends from the connecting portion 233. In one embodiment, a cross-sectional area of the screw portion 235 is greater than a cross-sectional area of the connecting portion 233.

The blocking member 30 includes a base portion 31 and an installation portion 33 connected to the base portion 31. The base portion 31 defines a through hole 311 communicating with the installation portion 33. In one embodiment, the base portion 31 is substantially circular, a diameter of the base portion 31 is substantially equal to a diameter of the cap 21, and the installation portion 33 is substantially a hollow column. Two cutouts 313 are defined in two opposite sides of the blocking member 30. Two positioning portions 315 are located on the base portion 31, and each of the two positioning portions 315 extends from a sidewall of each of the two cutouts 313. In one embodiment, the two positioning portions 315 are symmetrical about the installation portion 33 and each of the two positioning portions 315 is substantially "U" shaped.

The pivot member 40 comprises an operating portion 41 and two latching portions 43 extending towards each other from two opposite ends of the operating portion 41. In one embodiment, the operating portion 41 is substantially semicircular.

Figure 2:
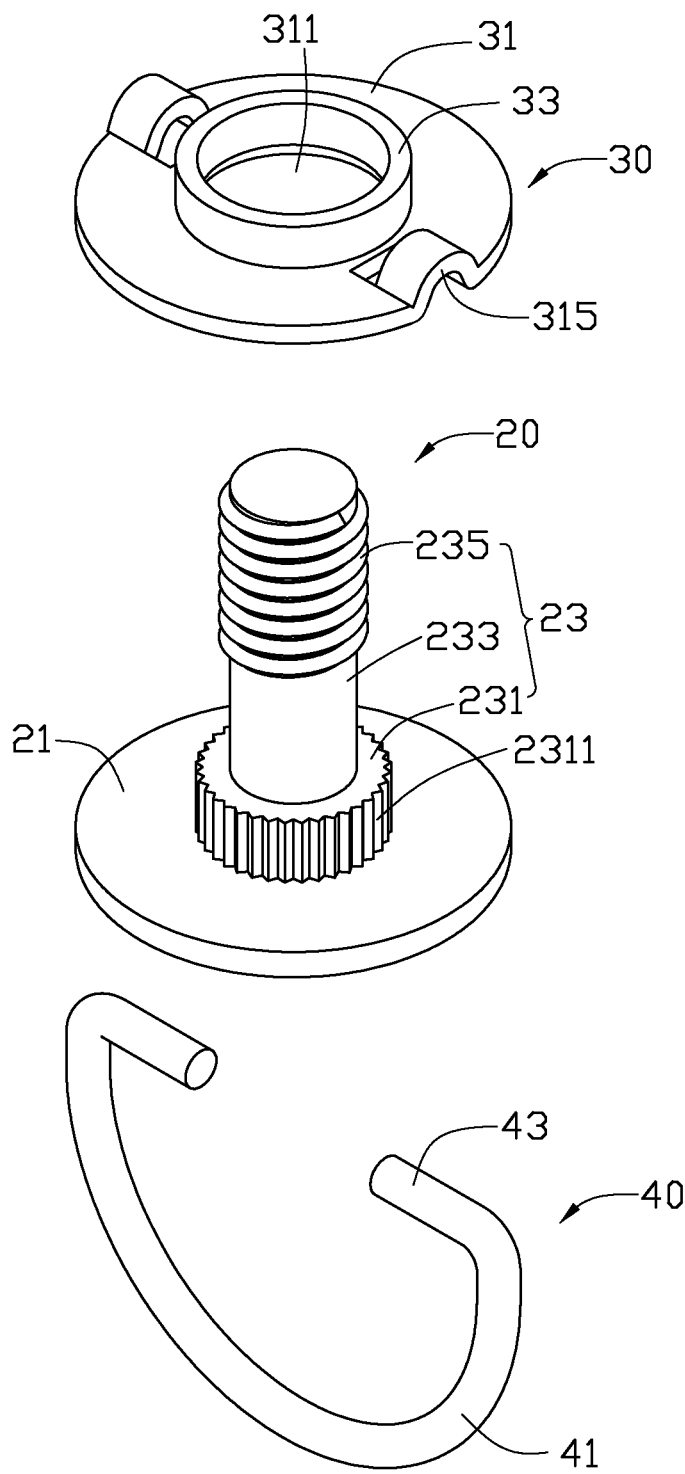
FIG. 2 is similar to FIG. 1, but viewed in a different aspect.
Figure 3:
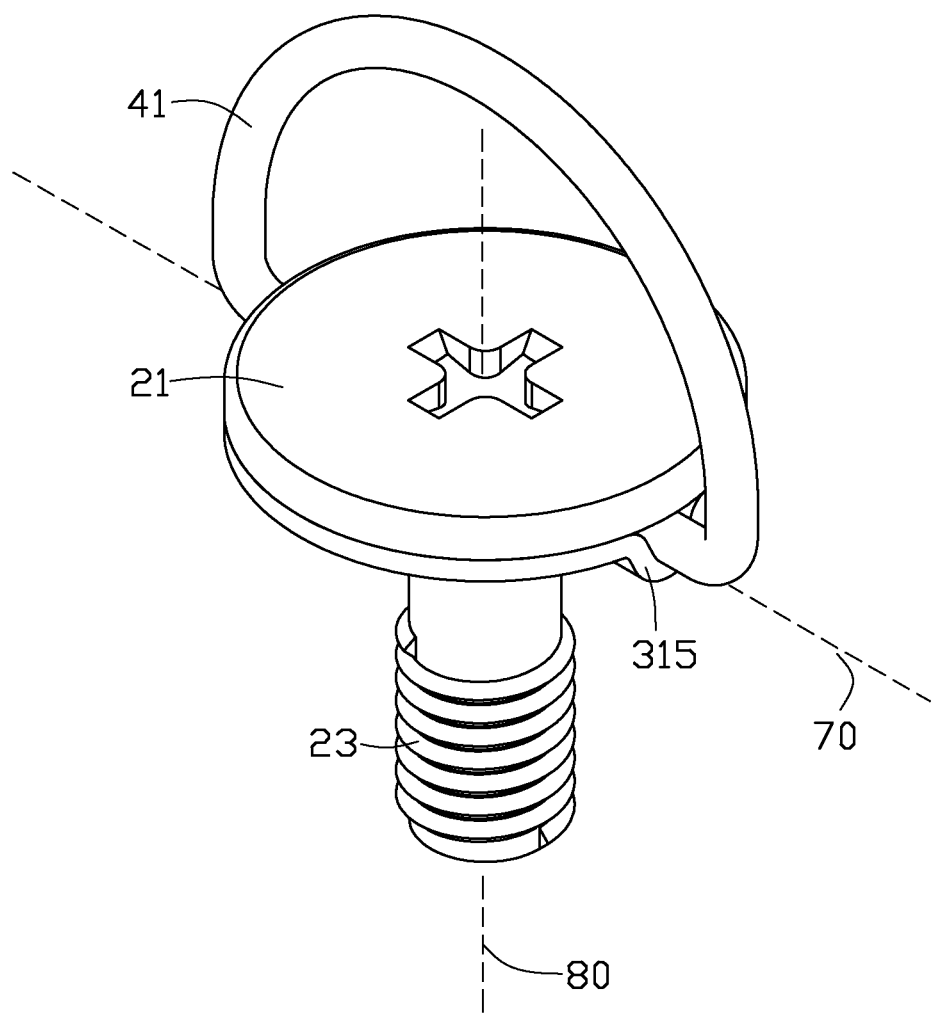
FIG. 3 is an isometric view of the assembled screw structure of FIG. 1.

Referring to FIGS. 2-3, in assembly, the two latching portions 43 are engaged above the cap 21. The pole 23 extends through the through hole 311 to the installation portion 33 engage with the plurality of the threads 2311. Each of the two latching portions 43 is engaged with each of the two positioning portions 315 to be located between each of the two positioning portions 315 and the cap 21.

Figure 4:
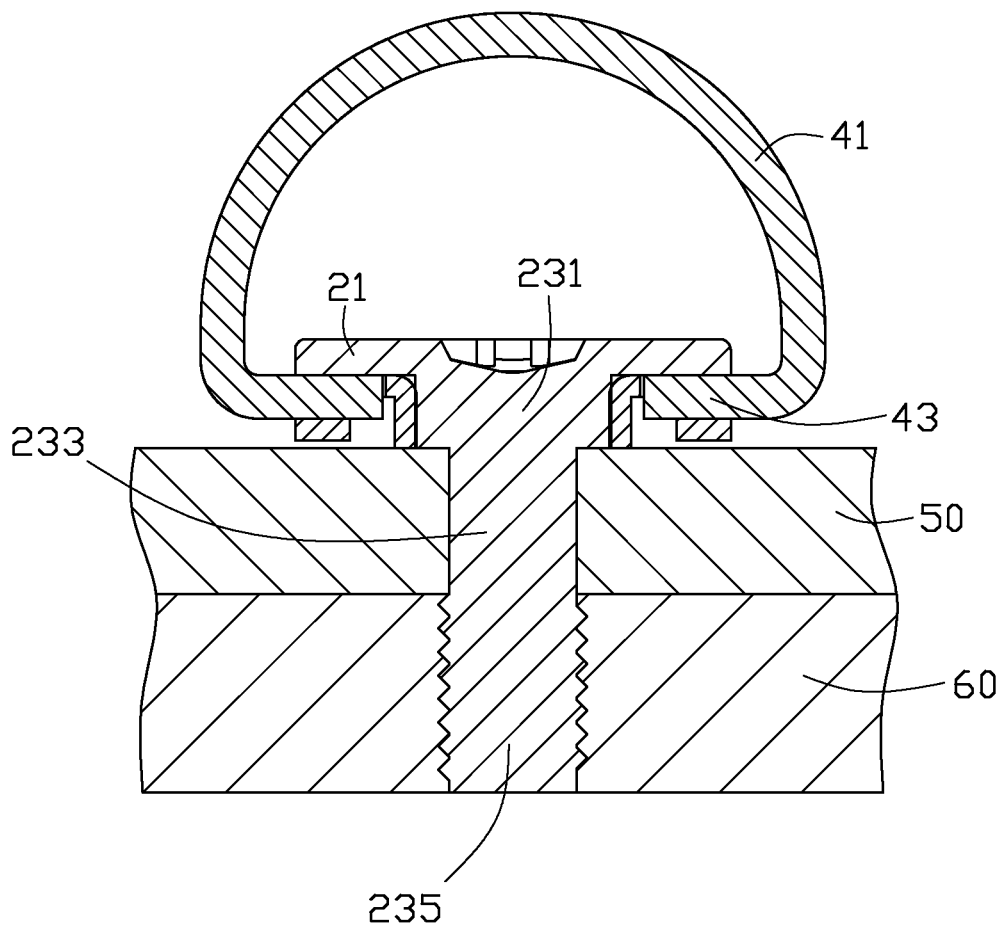
FIG. 4 is a cross-sectional view of the screw structure secured into a first object and a second object.

Referring to FIG. 4, in use, the operating portion 41 of the screw structure is pulled clear, and the operating portion 41 is rotated about a pivot axis 70, and an end of the pole 23 is aligned with an installation hole (not labeled) defined in the first object 50. The operating portion 41 is rotated about a center axis 80 in a first direction to drive the pole 23 to screw in the installation hole of the first object 50. The screw portion 235 screws in a securing hole of the second object 60. The screw portion 325 engages in the securing hole of the second object 60. In one embodiment, the pivot axis 70 is substantially perpendicular to the center axis 80.

In disassembly of the screw structure, the operating portion 41 is rotated in a second direction opposite to the first direction, and the screw portion 235 is disengaged from the securing hole of the second object 60, until the pole 23 is disengaged from the installation member of the first object 50. Thereby, the screw structure is removed from the first object 50 and the second object 60.

It is to be understood, however, that even though numerous characteristics and advantages have been set forth in the foregoing description of embodiments, together with details of the structures and functions of the embodiments, the disclosure is illustrative only and changes may be made in detail, especially in the matters of shape, size, and arrangement of parts within the principles of the disclosure to the full extent indicated by the broad general meaning of the terms in which the appended claims are expressed.

What is claimed is:

1. A screw structure comprising:
a screw member;
a blocking member secured to the screw member, the blocking member comprising two positioning portions;
a pivot member, the pivot member comprising two latching portions, each of the two latching portions being engaged between the screw member and each of the two positioning portions; and the pivot member being rotatable relative to the screw member and the blocking member;
the screw member comprises a cap, each of the two latching portions is located between each of the two positioning portions and the cap; and
the screw member further comprises a pole connected to the cap, the pole comprises a stopper portion, a plurality of threads is located on the stopper portion and the blocking member is secured to the plurality of the threads.

2. The screw structure of claim 1, wherein the pole further comprises a connecting portion extending from the stopper portion, a cross-sectional area of the connecting portion is smaller than a cross-sectional area of the stopper portion, and the cross-sectional area of the stopper portion is smaller than a cross-sectional area of the cap.

3. The screw structure of claim 1, wherein the blocking member comprises a base portion and an installation portion connected to the base portion, the base portion defines a through hole communicating with the installation portion, the pole is adapted to extend though the through hole to engage with the plurality of threads.

4. The screw structure of claim 3, wherein a section of the base portion and a section of the cap are substantially circular, and a diameter of the base portion is substantially equal to a diameter of the cap.

5. The screw structure of claim 4, wherein the installation portion is secured to the plurality of threads, and the base portion abuts the cap.

6. The screw structure of claim 5, wherein the two positioning portions are symmetrical about the installation portion.

7. The screw structure of claim 1, wherein the pivot member further comprises an operating portion adapted to rotate the screw member, and the operating portion is substantially arc-shaped.

8. The screw structure of claim 1, wherein the blocking member defines a pivot axis and the pivot member is rotatable on the pivot axis, the screw structure defines a center axis and the pivot member is rotatable on the pivot axis, and the pivot axis is substantially perpendicular to the center axis.

9. A screw structure for securing a first object to a second object comprising:
a screw member, the screw member comprising a pole;
a blocking member, the blocking member comprising a base portion, two positioning portions located on the base portion, a through hole defined in the base portion;
a pivot member, the pivot member comprising two latching portions, each of the two latching portions being engaged between the screw member and each of the two positioning portions;
wherein the pole extends through the through hole to secure the blocking member to the pole, the pole is configured to engage with the first object and the second object, and the pole is configured to be disengaged from the first object and the second object by the rotating pivot member;
the pole comprises a stopper portion, and the stopper portion is engaged in the through hole; and
a plurality of threads is located on the stopper portion, the blocking member contact with the plurality of threads.

10. The screw structure of claim 9, wherein the screw member further comprises a cap, the stopper portion extends from the cap, and a cross-sectional area of the stopper portion is smaller than a cross-sectional area of the cap.

11. The screw structure of claim 9, wherein the pole further comprises a connecting portion extending from stopper portion, and a screw portion extending from the connecting portion, the connecting portion is received in the first object, and the screw portion is engaged in the second object.

12. The screw structure of claim 11, wherein a cross-sectional area of the connecting portion is smaller than a cross-sectional area of the stopper portion, and a cross-sectional area of the screw portion is smaller than the cross-sectional area of the stopper portion.

13. The screw structure of claim 9, wherein the blocking member further comprises an installation portion connected to the base portion, the plurality of threads is engaged with the installation portion.

14. The screw structure of claim 9, wherein a section of the cap and a section of the blocking member are both circular, and a diameter of the cap is substantially equal to a diameter of the blocking member.

15. The screw structure of claim 14, wherein the pivot member further comprises an operating portion adapted to rotate the screw structure, and the operating portion is substantially semicircular.

16. The screw structure of claim 9, wherein the blocking member defines a pivot axis and the pivot member is rotatable on the pivot axis, the screw structure defines a center axis and the pivot member is rotatable on the pivot axis, and the pivot axis is substantially perpendicular to the center axis.

* * * * *